US006301834B1

United States Patent
Tyves

(10) Patent No.: US 6,301,834 B1
(45) Date of Patent: Oct. 16, 2001

(54) WINDOWPANE RETAINER ASSEMBLY

(75) Inventor: Zinovy Tyves, Windsor (CA)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/436,843

(22) Filed: Nov. 9, 1999

(51) Int. Cl.$^7$ .................................. E05D 15/16
(52) U.S. Cl. .............................. 49/441; 49/489.1
(58) Field of Search ..................... 49/440, 441, 374, 49/495.1, 483.1, 489.1, 475.1

(56) References Cited

U.S. PATENT DOCUMENTS

| | | | |
|---|---|---|---|
| 4,530,186 | * | 7/1985 | Guillon ................................. 49/441 |
| 4,553,354 | * | 11/1985 | Barbero ............................. 49/441 X |
| 4,969,293 | * | 11/1990 | Guillon ................................. 49/441 |
| 5,010,689 | * | 4/1991 | Vaughan ......................... 49/495.1 X |

FOREIGN PATENT DOCUMENTS

403854 * 12/1990 (EP) ...................................... 49/441

* cited by examiner

Primary Examiner—Jerry Redman
(74) Attorney, Agent, or Firm—Patrick M. Griffin

(57) ABSTRACT

A windowpane retainer assembly for retaining and guiding a side edge of an automotive windowpane. The assembly includes an elongated windowpane retainer fixed along a side edge of the windowpane. The assembly also includes a glass run channel that retains and guides reciprocal motion of the windowpane retainer. The glass run channel is mounted in an elongated channel receptacle in an automotive doorframe. Two retainer ramp surfaces engage corresponding channel ramp surfaces of the glass run channel such that increasing lateral pane extraction forces are countered by proportionately increasing lateral pane retention forces. The pane retention forces reduce or eliminate windowpane slop and prevent the windowpane from cocking within the channel receptacle of the doorframe. Low-friction surfaces minimize or eliminate windowpane wedging and jamming within the channel.

24 Claims, 4 Drawing Sheets

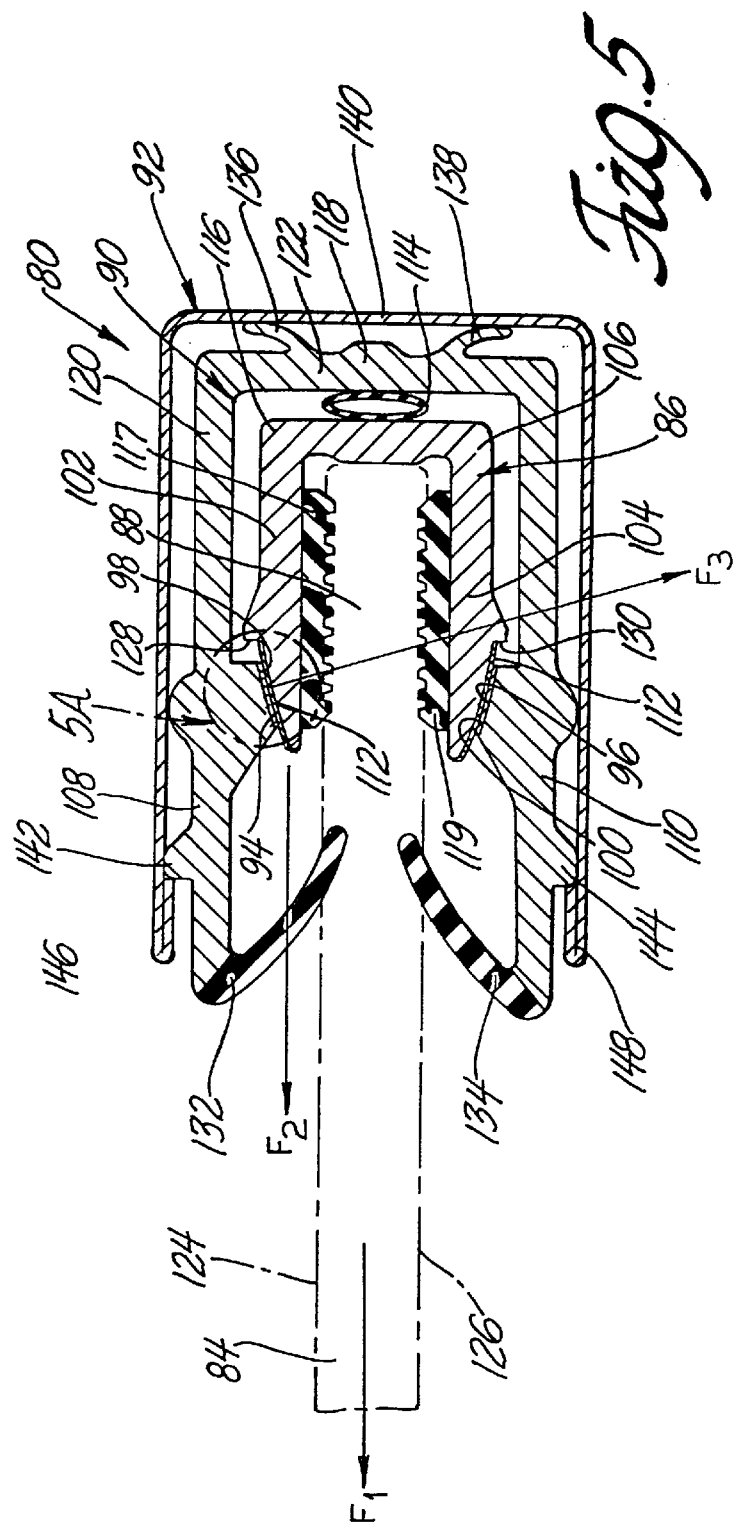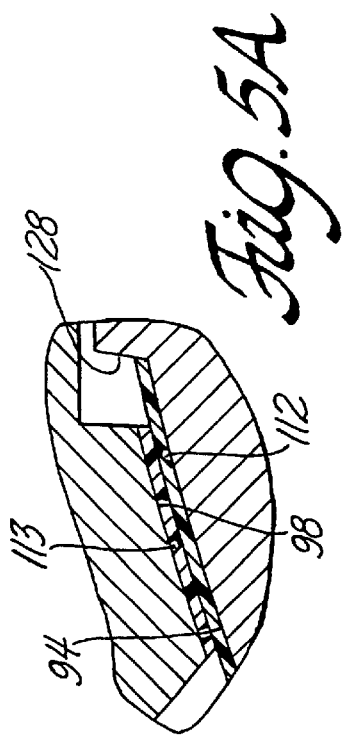

WINDOWPANE RETAINER ASSEMBLY

TECHNICAL FIELD OF THE INVENTION

This invention relates generally to a glass windowpane retainer assembly for laterally retaining a side edge of an automotive windowpane within a glass run channel while allowing reciprocal windowpane movement within the channel and parallel to the side edge.

BACKGROUND OF THE INVENTION

It is known for an automotive glass windowpane retainer to include glass run channels that mount in a vehicle doorframe and slidably receive the side edges of windowpanes. The channels guide reciprocal and generally vertical movement of the windowpanes driven by a cable, tape or lift arm-type regulator operatively connected to a lower edge of the windowpane. (A cable or tape type regulator is shown schematically at 8 in FIG. 1 in the drawings and a lift arm-type regulator is shown schematically at 9 in FIG. 1.) It is desirable for windowpane retainers of this type to include some means for preventing a windowpane from moving laterally within the channels and possibly cocking in the doorframe such that an upper corner of the windowpane is pulled out of a channel. For this reason, prior art retainers have included features that attempt to minimize such movement.

For example, the windowpane retainer design 10 used in General Motors 1986 "A" body vehicles and 1988 "W" body vehicles (the GM A&W retainer design) and shown in FIGS. 1 and 2 in the drawings, includes a glass windowpane 11 and an elongated windowpane retainer 12. The windowpane retainer 12 is fixed to the windowpane 11 along one side edge 14 of the windowpane in the 1986 "A" body design 16 and along two opposing side edges 14, 18 of the windowpane 11 in the 1988 "W" body design 20 as shown in FIG. 1. As shown in FIG. 2, the windowpane retainer 12 includes a pair of elongated retainer detent surfaces 22 that extend from a base end 24 of the retainer 12 in opposite directions generally perpendicular to respective interior and exterior pane surfaces 26, 28 of the windowpane 11. The 1986 "A" body design 16 includes a pin guide or glass run channel 30 that includes an elongated interior metal substrate or guide channel portion 32 having a generally U-shaped cross-section. The 1988 "W" body design 20 includes two glass run channels 30. The glass run channel 30 is shaped to fit within an elongated channel receptacle 34 in an automotive doorframe 36. Two elongated recesses 36 are formed along opposing sidewalls 38 of the glass run channel 30 and are shaped and positioned to engage two opposing doorframe return flanges 40 or hems that extend into the recesses 36 from side walls 42 of the channel receptacle 34. Engagement of the doorframe return flanges 40 in the glass run channel sidewall recesses 36 retains the glass run channel 30 within the channel receptacle 34 of the doorframe 36. The glass run channel 30 slidably retains the windowpane retainer 12 to permit vertical reciprocal movement of the windowpane 11. The glass run channel 30 includes integral elongated spring-back elements 44 that integrally extend from along a base wall 46 of the glass run channel 30. The spring-back elements 44 engage a receptacle base wall 48 of the channel receptacle 34 and serve to bias the glass run channel 30 away from the receptacle base wall 48. The glass run channel 30 also includes elongated seal flaps 50 that extend integrally inward toward each other from the channel sidewalls 38 and press against and sealingly engage the respective inner and outer windowpane surfaces 26, 28. The glass run channel 30 also includes a pair of elongated channel flanges 52 that extend diagonally inward toward the base wall 46 of the glass run channel 30 from opposite walls of the metal substrate 32 that lines the base wall 46 and side walls 38 of the channel 30. The channel flanges 52 extend diagonally inward so that, upon insertion of the retainer 12 during assembly, the flanges 52 will bend away from each other when engaged by the base 24 of the retainer 12. The channel flanges 52 then snap into engagement with the respective retainer detent surfaces 22 to resist lateral extraction of the windowpane retainer 12. However, a glass windowpane retainer assembly constructed according to the GM A&W retainer design cannot laterally retain a side edge 14 of an automotive windowpane 11 without gluing the retainer 12 to the side edge 14.

In addition, windowpane retainer designs such as that shown in FIGS. 3 and 4 in the drawings are known to have been used by a number of original equipment manufacturers (OEMs) including General Motors. This type of retainer design 54 includes an elongated cam or pin guide 56 supported on a doorframe 58 and a slider 60 slidably supported in the cam guide 56 for reciprocal motion parallel to the cam guide 56. This retainer assembly 54 also includes a beauty button 62 connected to the slider 60 by a pin 64 that extends through a hole 66 formed in a glass windowpane 68. The beauty button 62, pin 64, slider 60 and cam guide 56 support the windowpane 68 against lateral motion while allowing reciprocal motion parallel to the cam guide 56. However, while this type of retainer provides rigid retention against lateral windowpane movement, it is difficult to conceal the beauty button, pin and slider without adding a wide "black out area" 70 as shown in FIG. 3.

What is needed is a glass windowpane retainer assembly that laterally retains a side edge of an automotive windowpane without adhering any structures to the glass, penetrating or marking the glass or adding a "black out area" to conceal aesthetically disruptive retainer structures.

SUMMARY OF THE INVENTION

A glass windowpane retainer assembly is provided for laterally retaining a side edge of an automotive windowpane within a glass run channel while allowing reciprocal windowpane movement within the channel and parallel to the side edge. The assembly includes a windowpane and an elongated windowpane retainer fixed to the windowpane along a side edge of the windowpane. The glass windowpane retainer assembly also includes a glass run channel configured to slidably retain and guide reciprocal motion of the windowpane retainer, the glass run channel being configured to engage and be retained by an elongated channel receptacle in an automotive doorframe.

Unlike the prior art, the glass windowpane retainer assembly also includes a pair of retainer ramp surfaces configured to engage corresponding channel ramp surfaces of the glass run channel such that increasing lateral pane extraction forces are countered by proportionately increasing lateral pane retention forces.

This reduces or eliminates windowpane slop and prevents the windowpane from cocking within the doorframe channel receptacle. Therefore, a glass windowpane retainer assembly constructed according to the invention is able to laterally retain a side edge of an automotive windowpane without adhering any structures to the glass or employing glass-penetrating implements that require additional concealment measures.

BRIEF DESCRIPTION OF THE DRAWINGS

To better understand and appreciate the invention, refer to the following detailed description in connection with the accompanying drawings:

FIG. 5 is a cross-sectional top view of a window retainer assembly constructed according to the invention;

FIG. 5A is a magnified cross-sectional top view of a portion of the window retainer assembly of FIG. 5 shown within circle A.

DETAILED DESCRIPTION

Figure 1:
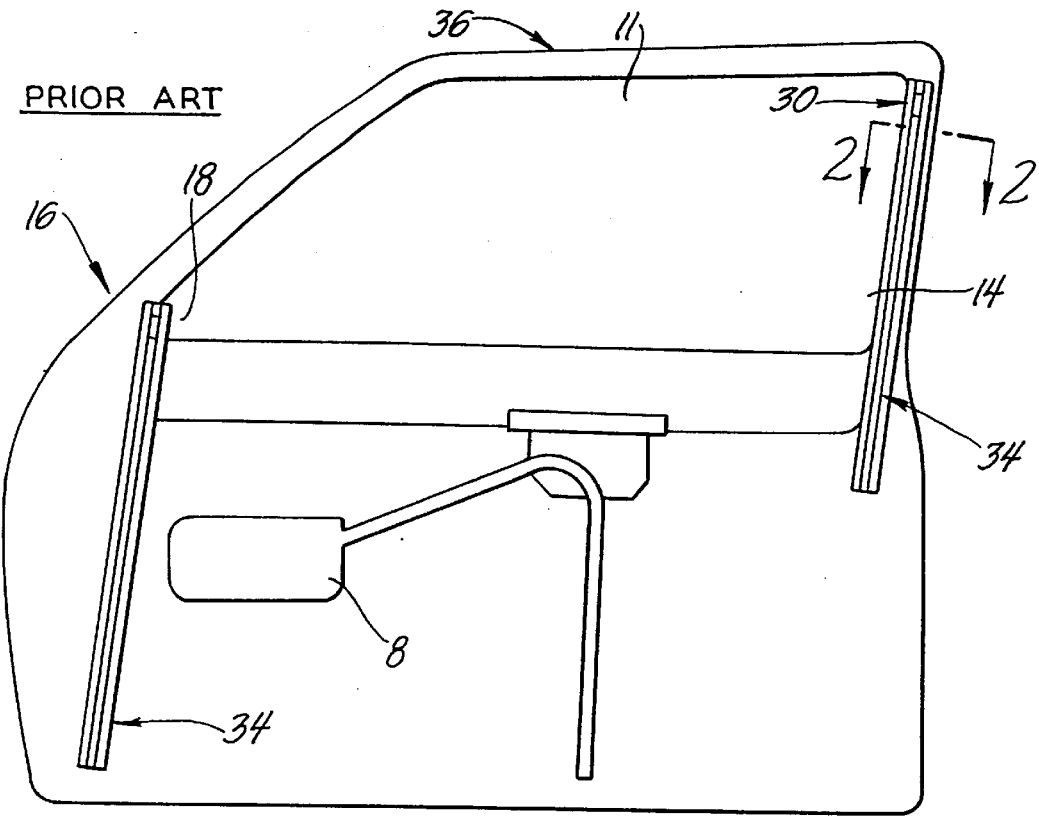
FIG. 1 is a schematic front view of two prior art automotive doors with respective outer body panels removed.
Figure 1A:
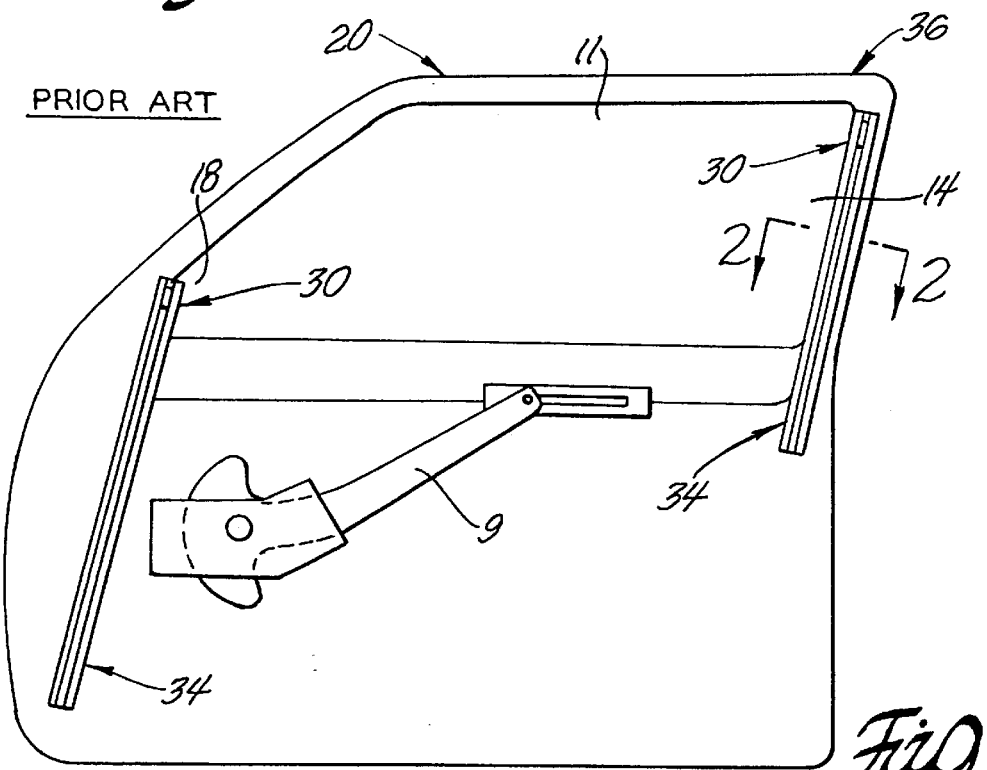
Figure 2:
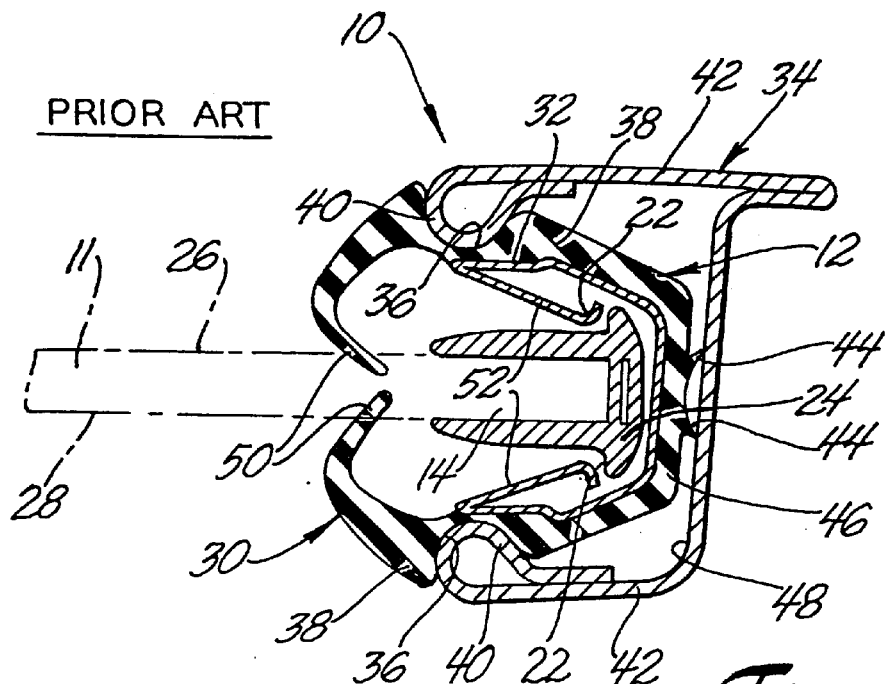
FIG. 2 is a partial cross-sectional top view of either of glass retainer assemblies of the doors of FIG. 1 taken along line 2—2 of either door panel window frame.
Figure 6:
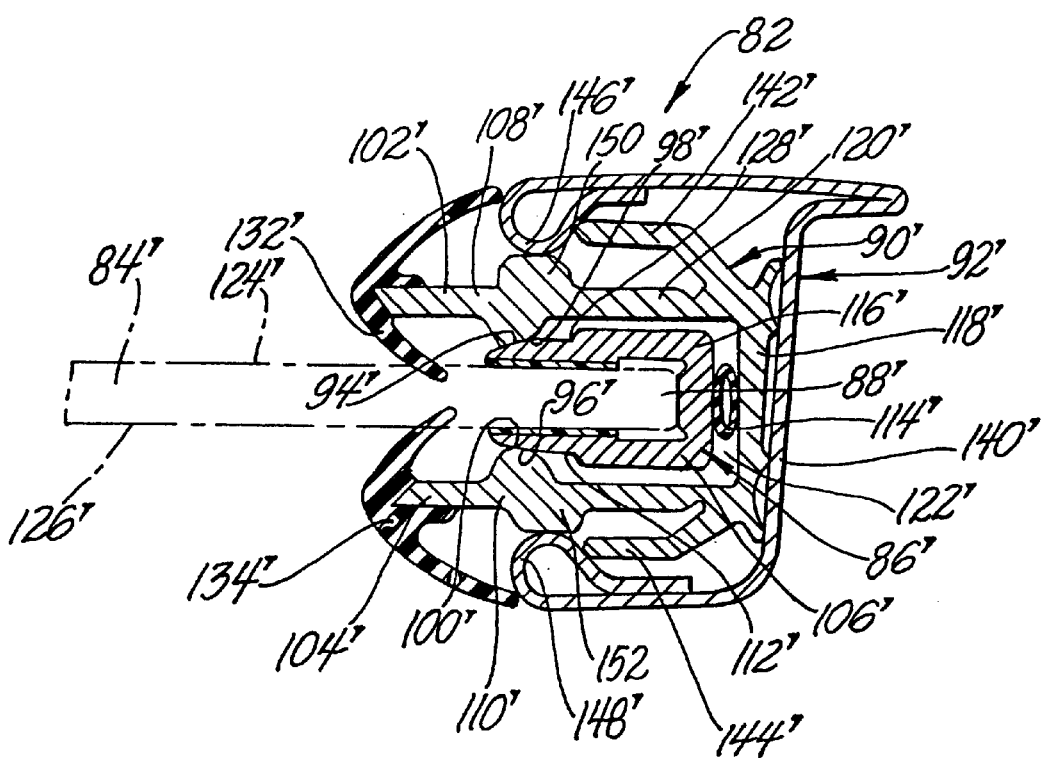
FIG. 6 is a cross-sectional top view of a window retainer assembly constructed according to an alternative embodiment of the invention.
Figure 3:
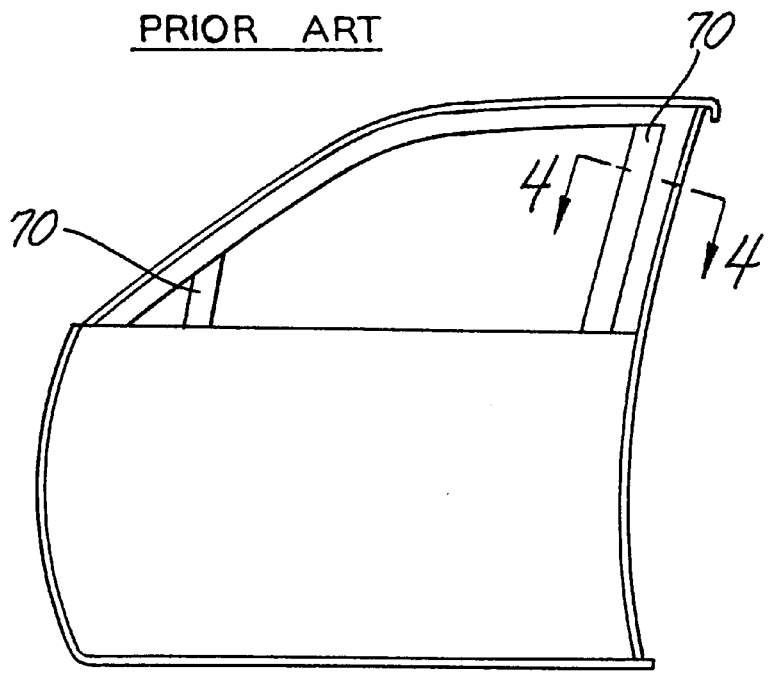
FIG. 3 is a front view of a prior art automotive door.
Figure 4:
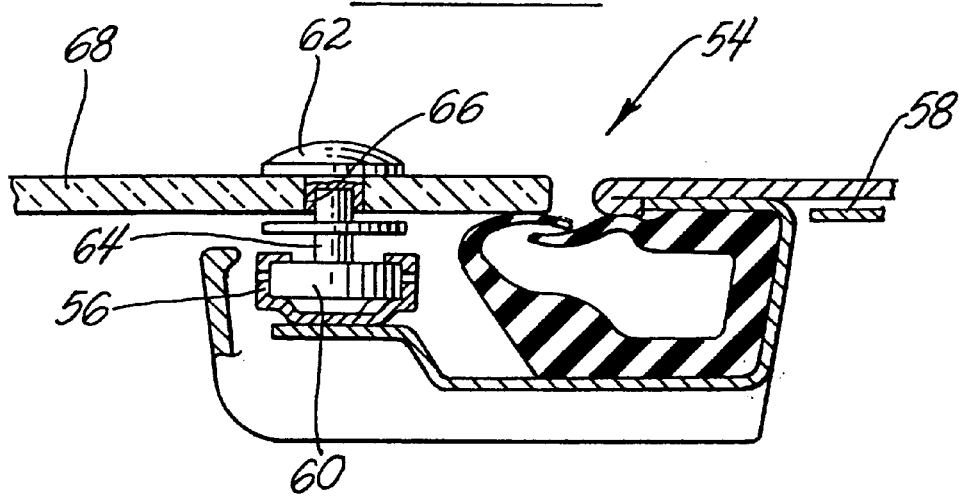
FIG. 4 is a cross-sectional top view of the door of FIG. 3 taken along line 4—4.

A glass windowpane retainer assembly 80 constructed according to a first embodiment of the invention is shown in FIG. 5. A retainer assembly 82 constructed according to a second embodiment of the invention is shown in FIG. 6. Reference numerals with the designation prime (') in FIG. 6 indicate an alternative configuration of elements that also appear in the first embodiment. Unless indicated otherwise, where a portion of the following description uses a reference numeral to refer to the figures, I intend that portion of the description to apply equally to elements designated by prime numerals in FIG. 6.

According to the first embodiment shown in FIG. 5, the assembly 80 includes a glass windowpane 84 and a co-extruded elongated windowpane retainer 86 press fit to the windowpane 84 along a side edge 88 of the windowpane 84. The assembly 80 also includes a glass run channel 90 having a generally U-shaped cross section and configured to slidably retain and guide generally vertical reciprocal motion of the windowpane retainer 86. The glass run channel 90 is configured to fit within and be retained by an elongated channel receptacle 92 of an automotive doorframe. The windowpane retainer 86 includes a pair of elongated retainer ramp surfaces 94, 96 configured to engage elongated corresponding channel ramp surfaces 98, 100 of the glass run channel 90. The retainer ramp surfaces 94, 96 engage the channel ramp surfaces 98, 100 in such a way that increasing lateral pane extraction forces F1 are countered by proportionally increasing lateral pane retentive and clamping forces F2, F3. Because these retentive and clamping forces F2, F3 result from lateral windowpane movement, the arrangement reduces or eliminates windowpane slop and prevents the windowpane 84 from cocking in the doorframe.

The retainer ramp surfaces 94, 96 are disposed on respective interior and exterior sidewalls 102, 104 of a main body 106 of the retainer 86. The retainer ramp surfaces 94, 96 angle outward relative to the windowpane 84 such that the distance between the retainer ramp surfaces 94, 96 is greater when measured closer to a base wall 116 of the main body 106 of the retainer 86. The channel ramp surfaces 98, 100 are angled parallel to their respective corresponding retainer ramp surfaces 94, 96. The channel ramp surfaces 98, 100 are supported on respective interior and exterior sidewalls 108, 110 of the channel 90 in such a way as to cause the channel ramp surfaces 98, 100 to lie flat against the corresponding retainer ramp surfaces 94, 96. In this position the channel ramp surfaces 98, 100 transmit convergent clamping forces F3 onto respective interior and exterior surfaces of the windowpane 84 through the interior and exterior retainer sidewalls 102, 104 in response to lateral windowpane 84 pull out forces F1. In other words, if the pane 84 is pulled away from the channel 90, the retainer ramp surfaces 94, 96 wedge against the channel ramp surfaces 98, 100. The channel ramp surfaces 98, 100 are supported against splaying outwardly and cause the retainer ramp surfaces 94, 96 to move toward each other, clamping the pane 84 between interior and exterior friction pads 117, 119 and preventing the windowpane 84 from separating from or shifting relative to the retainer 86.

The windowpane retainer 86 includes two layers 112 of low friction material disposed on the respective retainer ramp surfaces 94, 96 to reduce friction between the retainer ramp surfaces 94, 96 and the channel ramp surfaces 98, 100 as the windowpane 84 and the windowpane retainer 86 move reciprocally within the glass run channel 90. Each layer 112 of low friction material is preferably film of less than 1/10 of a millimeter in thickness. Each layer 112 preferably comprises a low friction polypropylene formulation. In other embodiments, the layers 112 may comprise any one of a number of suitable formulations to include a Tetrafluoroethylene polymer (Teflon®). Two additional layers 113 of low friction material may also be disposed on the respective channel ramp surfaces 98, 100. Each additional layer 113 is also preferably a film of less than 1/10 of a millimeter in thickness and preferably comprises a low friction polypropylene formulation. As with the layers 112 on the retainer ramp surfaces 94, 96, the additional layers 113,in other embodiments, may comprise any one of a number of suitable formulations to include a Tetrafluoroethylene polymer (Teflon®).

Where the formulation includes a Tetrafluoroethylene polymer, the layer may be in the form of tape. The use of a tape to provide the layer of low friction material 112 on the retainer ramp surfaces 94, 96 allows a manufacturer to co-extrude the retainer 86 using different materials (other than polypropylene) and/or materials of different durometer values to form the high friction areas of the retainer 86 and the main body of the retainer 86. The low friction tape would, in this case, be married to the extruded surface directly on the extrusion line.

The channel 90 also includes an elongated flexible loop 114 connected to and along a base wall 118 of a main body 120 of the channel 90 in a position in which a portion of an outer surface of the flexible loop 114 slidably engages a base wall 116 of the main body 106 of the retainer 86. The flexible loop 114 biases the windowpane retainer 86 away from the base wall 118 of the channel 90 throughout the entire up and down travel of the windowpane retainer 86 and windowpane 84.

The channel 90 includes a layer of low friction material 122 that is disposed on the outer surface of the flexible loop 114. This layer of low friction material 122 reduces the friction developed between the loop 114 and the base wall 116 of the retainer 86 as the channel 90 guides up and down movement of the windowpane 84 and windowpane retainer 86.

The friction pads 117, 119 of the retainer 86 are supported opposite one another on respective facing surfaces of the interior and exterior retainer sidewalls 102, 104. The friction pads 117, 119 are positioned to compressively engage respective interior and exterior surfaces 124, 126 of the windowpane 84 along the side edge 88 of the windowpane 84. The friction pads 117, 119, the layer of low friction material 112 and the main body 106 of the retainer 86 are co-extruded from three materials of different respective durometer values to form the retainer 86 as a single unitary, tri-durometer piece.

The windowpane retainer 86 also includes a pair of elongated retainer detent surfaces 128, 130 that extend from the retainer 86 in opposite directions generally perpendicular to the interior and exterior windowpane surfaces 124, 126, respectively. The retainer detent surfaces 128, 130 act as backup retainer surfaces for preventing windowpane 84 extraction should the retainer 86 and channel ramp surfaces 98, 100 fail to hold the windowpane retainer 86 against a strong lateral withdrawing force F1.

The main body portion 120 of the glass run channel 90 has a generally U-shaped cross section larger than that of the retainer 86. The glass run channel 90 includes interior and exterior elongated seal flaps 132, 134 that extend integrally inward toward each other from respective interior and exterior channel sidewalls 108, 110. The seal flaps 132, 134 are in sliding contact with the windowpane 84 and sealingly engage the interior and exterior windowpane surfaces 124, 126.

The glass run channel 90 also includes two integral elongated spring back elements 136, 138 that integrally extend from along the base wall 118 of the main body 120 of the channel 90. The spring back elements 136, 138 splay outwardly from the base wall 118 of the channel main body 120. The elements 136, 138 engage a base wall 140 of the channel receptacle 92 in such a way as to bias the channel 90 away from the base wall 140 of the channel receptacle 92.

The sidewalls 108, 110 of the glass run channel main body 120 include a pair of channel detents 142, 144. The channel detents 142, 144 are shaped and positioned to engage a pair of opposing doorframe return flanges 146, 148 that extend inward from sidewalls of the channel receptacle 92. Engagement of the doorframe return flanges 142, 144 with the channel detents 142, 144 retains the glass run channel 90 within the channel receptacle 92 of the doorframe. According to the first embodiment, the doorframe return flanges 142, 144 comprise the elongated hemmed edges of the channel receptacle 92 sidewalls. Therefore, the channel detents 142, 144 comprise elongated integrally extending right angle ledges shaped to engage an inner hemmed edge of the doorframe return flanges 142, 144.

According to the second embodiment shown in FIG. 6, the doorframe return flanges 146', 148' comprise elongated rounded edge hems. The channel detents 142', 144' comprise a pair of elongated arms that extend outward and upward from the base wall 118' of the glass run channel 90' and engage the doorframe return flanges 146', 148' along upper distal elongated edges of those elongated arms.

As shown in FIG. 6, the second embodiment also includes interior and exterior elongated ribs 150, 152 supported on and integrally extending from the respective interior and exterior sidewalls 108', 110' of the glass run channel 90'. The ribs 150, 152 extend in opposite directions from the respective interior and exterior sidewalls 108', 110' and are aligned with the doorframe return flanges 146', 148' to brace the interior and exterior sidewalls 108', 110' of the glass run channel 90' against the doorframe return flanges 146', 148'. The interior and exterior sidewalls 108', 110' of the glass run channel 90' must be braced in this way to support the channel ramp surfaces 98', 100' against displaying outwardly in response to windowpane extraction forces.

In both the first and second embodiments the main body 120, the seal flaps 132, 134, and the low friction layers 112 or the channel 90 are co-extruded from materials of three different durometer values to form the glass run channel 90 as a single unitary tri-durometer piece. In addition, the flexible loop may also be co-extruded with the main body.

The main body 106 of the retainer 86 comprises a first elastomeric polymeric material such as polypropylene formulation including 25–45% talc by volume. The friction pads 117, 119 comprise a second elastomeric polymeric material that is softer than the first material. Because the friction pads 117, 119 comprise a softer material they are better able to grip the side edge 88 of the windowpane 84.

The glass run channel main body portion 120 comprises an elastomeric polymeric material such as the polypropylene formulation also specified for the main body 106 of the retainer 86. Likewise, the seal flaps 132, 134 of the glass run channel 90 comprise the softer second elastomeric polymeric material also specified for the friction pads 117, 119 of the retainer 86.

According to either embodiment of the invention, a glass windowpane retainer assembly 80 is provided that laterally retains an automotive windowpane 84 within a glass run channel 90—and does so without adhering any structures to the windowpane 84 and without having to include a "blackout" area designed to conceal windowpane retaining structures such as beauty buttons and the like. The inter-engaging retainer ramp surfaces 94, 96 and channel ramp surfaces 98, 100 additionally obviate the need to include a metal seal substrate within the glass run channel 90 to engage and prevent lateral extraction of the windowpane retainer 86. Because no adhesive need be applied to the window during assembly 80, and because a separate step for installing a metallic substrate is unnecessary, a retainer assembly 80 constructed according to the present invention is easier and less expensive to construct and install.

This description is intended to illustrate certain embodiments of the invention rather than to limit the invention. Therefore, descriptive rather than limiting words are used. Obviously, it's possible to modify this invention from the description teaches. Within the scope of the claims, one may practice the invention other than as described.

I claim:

1. A combination automotive windowpane and windowpane retainer assembly in which the windowpane retainer laterally retains a side edge of the windowpane while allowing reciprocal windowpane movement parallel to the side edge, the assembly comprising:

a windowpane;

an elongated windowpane retainer fixed to the windowpane along a side edge of the windowpane;

a glass run channel configured to slidably retain and guide reciprocal motion of the windowpane retainer, the glass run channel being configured to engage and be retained by an elongated channel receptacle in an automotive doorframe; and the windowpane retainer including a pair of retainer ramp surfaces configured to engage corresponding channel ramp surfaces of the glass run channel, the ramp surfaces being further configured to convert lateral pane extraction forces into convergent pane clamping forces sufficient to retain a windowpane in the windowpane retainer.

2. A combination windowpane and windowpane retainer assembly as defined in claim 1 in which:

the retainer ramp surfaces are disposed on respective interior and exterior retainer sidewalls of a main body of the retainer and angle outward relative to the windowpane such that the distance between the retainer ramp surfaces is greater when measured closer to a base wall of the main body of the retainer; and the channel ramp surfaces are parallel to the respective retainer ramp surfaces and are supported on respective interior and exterior sidewalls of a main body of the channel in positions that cause the channel ramp surfaces to lie flat against the corresponding retainer ramp surfaces and to transmit convergent clamping forces onto respective interior and exterior surfaces of the windowpane through the interior and exterior retainer sidewalls in response to lateral windowpane pull-out forces.

3. A combination windowpane and windowpane retainer assembly as defined in claim 2 in which the windowpane retainer includes a spring member connected to the base wall of the channel main body in a position slidably engaging a base wall of the retainer main body and biasing the windowpane retainer away from the base wall of the channel.

4. A combination windowpane and windowpane retainer assembly as defined in claim 3 in which the spring is a flexible loop connected to the base wall of the channel.

5. A combination windowpane and windowpane retainer assembly as defined in claim 4 in which:
the main body of the channel comprises an elastomeric polymeric material;
the flexible loop comprises an elastomeric polymeric material softer than that of the main body of the channel; and
the flexible loop is co-extruded with the main body to form the channel as a single unitary piece.

6. A combination windowpane and windowpane retainer assembly as defined in claim 4 in which the channel includes a layer of low friction material disposed on an outer surface of the loop.

7. A combination windowpane and windowpane retainer assembly as defined in claim 6 in which the layer of low friction material, the flexible loop and the channel main body are co-extruded to form the channel as a single unitary piece.

8. A combination windowpane and windowpane retainer assembly as defined in claim 2 in which the windowpane retainer includes a pair of friction pads supported opposite one another on respective facing surfaces of the interior and exterior retainer sidewalls, the friction pads compressively engaging the respective interior and exterior surfaces of the windowpane along the side edge of the windowpane.

9. A combination windowpane and windowpane retainer assembly as defined in claim 8 in which the friction pads and main body of the retainer are co-extruded to form the retainer as a single unitary piece.

10. A combination windowpane and windowpane retainer assembly as defined in claim 8 in which the main body portion of the retainer comprises a first elastomeric polymeric material and the friction pads comprise a second elastomeric polymeric material that is softer than the first material.

11. A combination windowpane and windowpane retainer assembly as defined in claim 2 in which the windowpane retainer includes an elongated interior retainer detent surface and an elongated exterior retainer detent surface that extend from the respective interior and exterior sidewalls of the main body of the retainer in opposite directions generally perpendicular to the respective interior and exterior windowpane surfaces of the windowpane.

12. A combination windowpane and windowpane retainer assembly as defined in claim 11 in which the interior and exterior channel sidewalls include a pair of channel detents configured to engage a pair of opposing doorframe return flanges that extend from side walls of the channel receptacle.

13. A combination windowpane and windowpane retainer assembly as defined in claim 1 in which the windowpane retainer includes a layer of low-friction material disposed on the retainer ramp surfaces.

14. A combination windowpane and windowpane retainer assembly as defined in claim 13 in which the layer of low friction material and a main body portion of the windowpane retainer are co-extruded to form the windowpane retainer as a single unitary piece.

15. A combination windowpane and windowpane retainer assembly as defined in claim 1 in which the glass run channel includes interior and exterior elongated seal flaps that extend integrally inward toward each other from respective interior and exterior channel sidewalls and sealingly engage respective interior and exterior surfaces of the windowpane.

16. A combination windowpane and windowpane retainer assembly as defined in claim 15 in which:
the glass run channel includes a main body portion comprising a first elastomeric polymeric material;
the seal flaps comprise a second elastomeric polymeric material that is softer than the first material; and
the first and second materials are co-extruded to form the glass run channel as a single unitary piece.

17. A combination windowpane and windowpane retainer assembly as defined in claim 16 in which:
the glass run channel includes a layer of low-friction material disposed on each of the channel ramp surfaces; and
the first and second materials and the low-friction material are co-extruded to form the glass run channel as a single unitary piece.

18. A combination windowpane and windowpane retainer assembly as defined in claim 16 in which the first material comprises a polypropylene formulation including 25–45% talc by volume.

19. A windowpane retainer assembly as defined in claim 16 in which the glass run channel includes an integral elongated spring-back element that integrally extends from along the base wall of the channel and is configured to engage and bias the channel away from a base wall of the channel receptacle.

20. A windowpane retainer assembly as defined in claim 19 in which:
the main body portion of the glass run channel comprises a first elastomeric polymeric material; and
the seal flaps and spring-back element comprise a second elastomeric polymeric material that is softer than the first material.

21. A windowpane retainer assembly as defined in claim 20 in which the main body of the channel, the seal flaps and the spring-back element are co-extruded to form the glass run channel as a single unitary piece.

22. A windowpane retainer assembly as defined in claim 20 in which the first material comprises a polypropylene formulation and the second material comprises a polypropylene formulation softer than the first material.

23. A combination windowpane and windowpane retainer assembly as defined in claim 1 in which the glass run channel includes an integral elongated spring-back element integrally extending from along a base wall of a main body of the channel and configured to engage and bias the channel away from a base wall of the channel receptacle.

24. A combination windowpane and windowpane retainer assembly as defined in claim 23 in which:
the main body portion of the glass run channel comprises a first elastomeric polymeric material;
the spring-back element comprises a second elastomeric polymeric material less resilient than the first material; and
the first and second materials are co-extruded to form the glass run channel as a single unitary piece.

* * * * *